(12) United States Patent
Anand et al.

(10) Patent No.: US 8,000,324 B2
(45) Date of Patent: Aug. 16, 2011

(54) PIPELINE ARCHITECTURE OF A NETWORK DEVICE

(75) Inventors: Anupam Anand, Newark, CA (US);
John Jeffrey Dull, Sunnyvale, CA (US);
Eric A. Baden, Saratoga, CA (US);
Michael J. Bowes, Mammoth Lakes, CA (US)

(73) Assignee: Broadcom Corporation, Irvine, CA (US)

( * ) Notice: Subject to any disclaimer, the term of this patent is extended or adjusted under 35 U.S.C. 154(b) by 1337 days.

(21) Appl. No.: 11/100,537

(22) Filed: Apr. 7, 2005

(65) Prior Publication Data

US 2006/0114914 A1 Jun. 1, 2006

Related U.S. Application Data

(60) Provisional application No. 60/631,577, filed on Nov. 30, 2004.

(51) Int. Cl.
*H04L 12/56* (2006.01)
(52) U.S. Cl. ........................................ 370/389
(58) Field of Classification Search ................ 370/388, 370/389, 392, 395.31, 395.32, 428, 422, 370/423
See application file for complete search history.

(56) References Cited

U.S. PATENT DOCUMENTS

| | | | |
|---|---|---|---|
| 5,414,704 A | 5/1995 | Spinney | |
| 5,423,015 A | 6/1995 | Chung | |
| 5,610,905 A | 3/1997 | Murthy et al. | |
| 5,892,922 A | 4/1999 | Lorenz | |
| 5,991,295 A | 11/1999 | Tout et al. | |
| 6,016,310 A | 1/2000 | Muller et al. | |
| 6,088,356 A | 7/2000 | Hendel et al. | |
| 6,119,196 A * | 9/2000 | Muller et al. | 710/243 |
| 6,259,699 B1 | 7/2001 | Opalka et al. | |
| 6,320,859 B1 * | 11/2001 | Momirov | 370/395.1 |
| 6,335,935 B2 | 1/2002 | Kadambi et al. | |
| 6,425,015 B1 | 7/2002 | Jennings et al. | |
| 6,430,188 B1 * | 8/2002 | Kadambi et al. | 370/398 |
| 6,591,299 B2 | 7/2003 | Riddle et al. | |
| 6,721,316 B1 * | 4/2004 | Epps et al. | 370/389 |
| 6,882,642 B1 * | 4/2005 | Kejriwal et al. | 370/388 |
| 6,891,834 B1 * | 5/2005 | Dally et al. | 370/395.4 |
| 7,069,372 B1 * | 6/2006 | Leung et al. | 710/306 |
| 7,903,555 B2 * | 3/2011 | Navada | 370/231 |
| 2005/0175018 A1 * | 8/2005 | Wong | 370/396 |
| 2005/0195832 A1 * | 9/2005 | Dharmapurikar et al. | 370/395.31 |
| 2006/0002386 A1 * | 1/2006 | Yik et al. | 370/389 |
| 2006/0031615 A1 * | 2/2006 | Bruce et al. | 710/240 |

FOREIGN PATENT DOCUMENTS

| | | |
|---|---|---|
| EP | 0312917 A2 | 4/1989 |
| EP | 0785699 A2 | 7/1997 |
| EP | 1093266 A2 | 4/2001 |
| WO | WO 99/00938 | 1/1999 |
| WO | WO 99/00949 | 1/1999 |
| WO | WO 99/00950 | 1/1999 |

* cited by examiner

*Primary Examiner* — Kwang B Yao
*Assistant Examiner* — Juvena Loo

(57) ABSTRACT

A network device for processing packets. The network device includes an ingress module for performing switching functions on an incoming packet. The network device also includes a memory management unit for storing packets and performing resource checks on each packet and an egress module for performing packet modification and transmitting the packet to an appropriate destination port. Each of the ingress module, memory management unit and egress module includes multiple cycles for processing instructions and each of the ingress module, memory management unit and egress module processes one packet every clock cycle.

20 Claims, 5 Drawing Sheets

PIPELINE ARCHITECTURE OF A NETWORK DEVICE

This application claims priority of U.S. Provisional Patent Application Ser. No. 60/631,577, filed on Nov. 30, 2004. The subject matter of the earlier filed application is hereby incorporated by reference.

BACKGROUND OF THE INVENTION

1. Field of the Invention

The present invention relates to a network device in a packet switched network and more particularly to a pipeline architecture implemented in the network device.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching and other processing are performed on the packets. Thereafter, the packets are transmitted to one or more destination ports through the MMU and the egress module. According to a current switching system architecture, when the packet enters one of the modules in the device, the module generates operation instructions and processes a single operation in more than one processing cycle. In this switching system architecture, processing functions in each module of the device is de-centralized. As such, the same processing functions may be implemented in more than one location in each module. This slows down the performance of the device and makes processing by the device more costly.

SUMMARY OF THE INVENTION

According to one aspect of the invention, there is provided a network device for processing packets. The network device includes an ingress module for performing switching functions on an incoming packet. The network device also includes a memory management unit for storing packets and performing resource checks on each packet and an egress module for performing packet modification and transmitting the packet to an appropriate destination port. Each of the ingress module, memory management unit and egress module includes multiple cycles for processing instructions and each of the ingress module, memory management unit and egress module processes one packet every clock cycle.

According to another aspect of the invention, there is provided a method for processing packets in a network device. The method includes the steps of performing switching functions on an incoming packet and storing packets and performing resource checks on each packet. The method further includes the step of implementing packet modification and transmitting the packet to an appropriate destination port. Instructions associated with each of the steps of performing, storing and implementing are processed in one clock cycle. One packet is processed every clock cycle.

According to another aspect of the invention, there is provided an apparatus for processing packets in a network device. The apparatus includes performing means for performing switching functions on an incoming packet. The apparatus also includes storing means for storing packets and performing resource checks on each packet. The apparatus further includes implementing means for implementing packet modification and transmitting the packet to an appropriate destination port. Instructions associated with each of the performing, storing and implementing means are processed in one clock cycle and one packet is processed every clock cycle.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
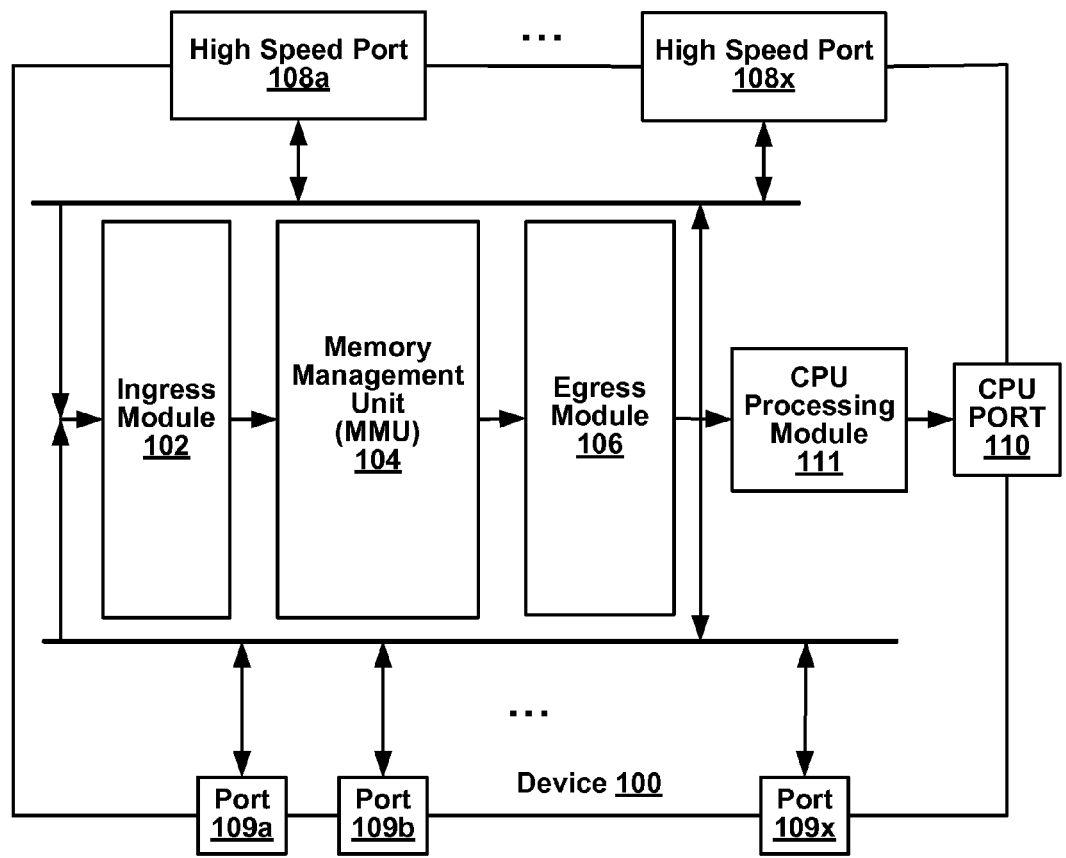
FIG. 1 illustrates a network device in which an embodiment of the present invention may be implemented.

FIG. 1 illustrates a network device 100, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The key to the performance of device 100 is the ability of the pipeline to process one packet every clock. According to an embodiment of the invention, device 100 includes a 133.33 MHz core clock. This means that the device 100 architecture is capable of processing 133.33 M packets/sec.

Device 100 may also include one or more internal fabric high speed ports, for example a HiGig port, 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. The XBOD is a block that has one 10 GE/12 G MAC and supports packets from high speed ports 108a-108x. The GBOD is a block that has 12 10/100/1 G MAC and supports packets from ports 109a-109x.

Figure 2:
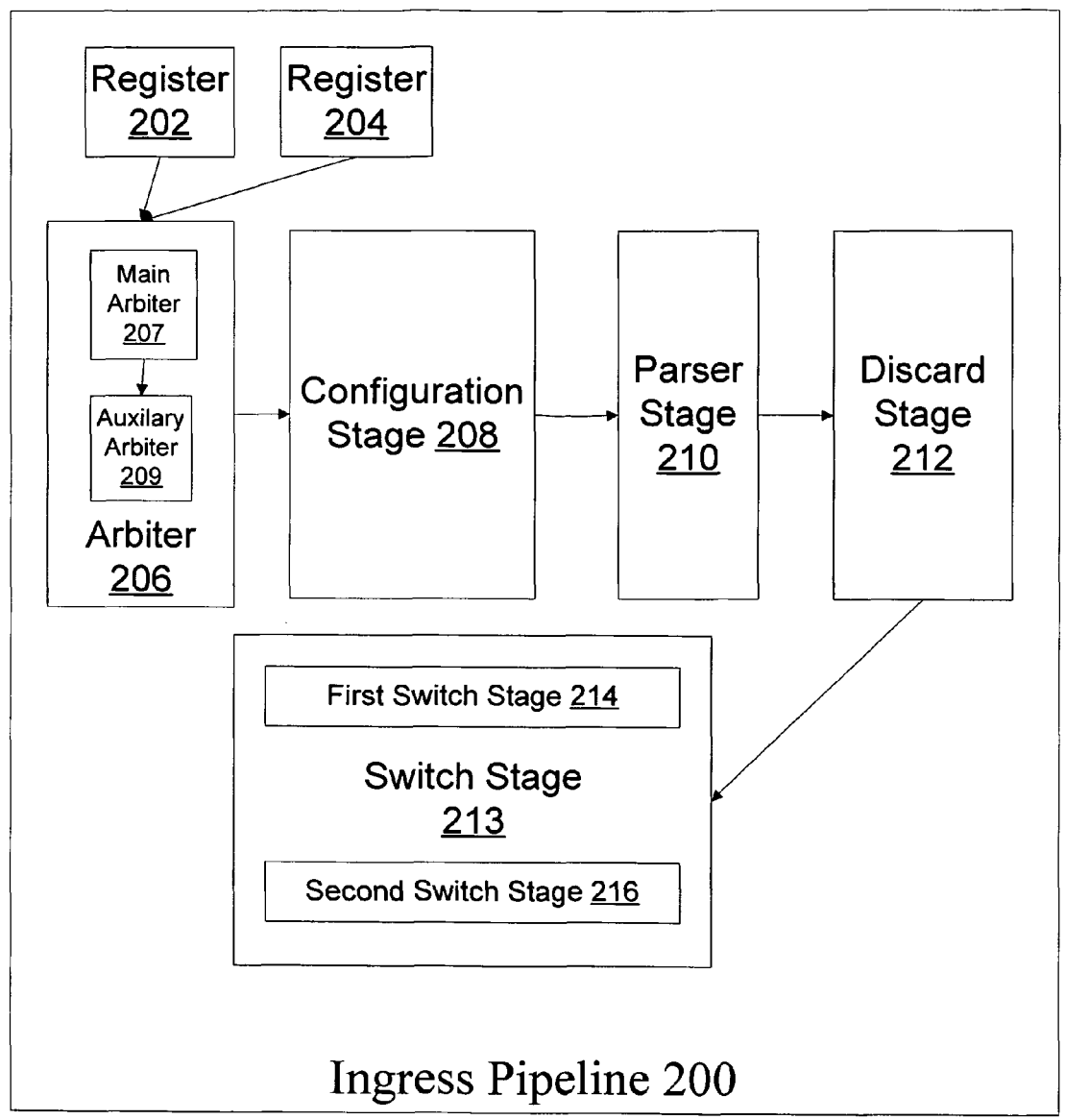
FIG. 2 illustrates a centralized ingress pipeline architecture.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunneled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, ingress pipeline 200 includes one 1024-bit cell data holding register 202 and one 96-bit module header register 204 for each XBOD or GBOD. Data holding register 202 accumulates the incoming data into one contiguous 128-byte cell prior to arbitration and the module header register 204 stores an incoming 96-bit module header for use later in ingress pipeline 200. Specifically, holding register 202 stores incoming status information, including a Start cell Of Packet (SOP) signal, an End cell Of Packet (EOP) field, a purge field for indicating that the packet should be purged, a statistic update field for indicating that statistic counters should be updated for a particular packet, a high speed field for indicating that the associated packet arrived at a high speed port, a pause packet field for indicating if a current high speed packet is a pause packet, a cell byte count field for indicating the total bytes accumulated for the cell and a source port field. As is apparent to one skilled in the art, holding register 202 may store other fields not specifically identified above.

Ingress pipeline 200 schedules requests from the XBOD and GBOD every six clock cycles and sends a signal to each XBOD and GBOD to indicate when the requests from the XBOD and GBOD will be scheduled. CPU processing module 111 transfers one cell at a time to ingress module 102 and waits for an indication that ingress module 102 has used the cell before sending subsequent cells. Ingress pipeline 200 multiplexes signals from each of XBOD, GBOD and CPU processing based on which source is granted access to ingress pipeline 200 by arbiter 206. Upon receiving signals from the XBOD or GBOD, a source port is calculated by register buffer 202, the XBOD or GBOD connection is mapped to a particular physical port number on device 100 and register 202 passes information relating to a scheduled cell to arbiter 206.

When arbiter 206 receives information from register buffer 202, arbiter 206 may issue at least one of a packet operation code, an instruction operation code or a FP refresh code, depending on resource conflicts. According to an embodiment, arbiter 206 includes a main arbiter 207 and auxiliary arbiter 209. Main arbiter 207 is a time-division multiplex (TDM) based arbiter that is responsible for scheduling requests from the GBOD and the XBOD, wherein requests from main arbiter 207 are given the highest priority. Auxiliary arbiter 209 schedules all non XBOD/GBOD requests, including CPU packet access requests, CPU memory/register read/write requests, learn operations, age operations, CPU table insert/delete requests, refresh requests and rate-limit counter refresh request and auxiliary arbiter's 209 requests are scheduled based on available slots from main arbiter 207.

When main arbiter 207 grants an XBOD or GBOD a slot, the cell data is pulled out of register 202 and sent, along with other information from register 202, down ingress pipeline 200. The XBOD/GBOD provides certain status bits, for example SOP, EOP and MOP status bits, to main arbiter 207 that it uses to schedule the XBOD/GBOD requests and resolve any arbitration conflicts with auxiliary arbiter 209. After scheduling the XBOD/GBOD cell, main arbiter 207 forwards certain status bits, for example SOP, EOP and MOP status bits, to auxiliary arbiter 209.

Auxiliary arbiter 209 is also responsible for performing all resource checks, in a specific cycle, to ensure that any operations that are issued simultaneously do not access the same resources. As such, auxiliary arbiter 209 is capable of scheduling a maximum of one instruction operation code or packet operation code per request cycle. According to an embodiment, auxiliary arbiter 209 implements resource check processing and a strict priority arbitration scheme. The resource check processing looks at all possible pending requests to determine which requests can be sent based on the resources that they use. Resources of ingress pipeline 200 are separated into lookup resources for SOP cells, MMU access for all cells, EOP resources for EOP cells and L2_MOD_FIFO resource for Layer 2 (L2) operations. The L2_MOD_FIFO resource is a 16 entry table that is used for tracking all updates to a Layer 2 (L2) table. Since the L2_MOD_FIFO resource is limited, auxiliary arbiter 209 restricts certain operations once the L2_MOD_FIFO resource is full. Additionally, auxiliary arbiter 209 may not schedule access to any address resolution processing faster than once every three clock cycles.

The strict priority arbitration scheme implemented in an embodiment of the invention requires that CPU access requests are given the highest priority, CPU packet transfer requests are given the second highest priority, rate refresh requests are given the third highest priority, CPU memory reset operations are given the fourth highest priority and Learn and age operations are given the fifth highest priority by auxiliary arbiter 209, Upon processing the cell data, auxiliary arbiter 209 transmits packet signals, including SOP and EOP, the 1024 bit packet cell data, a L2_MOD_FIFO lock bit, instruction operation code information and instruction write data to configuration stage 208. As is apparent to one skilled in the art, the arbiter may transmit other types and/or configurations of information to configuration stage 208.

Configuration stage 208 includes a port table for holding all major port specific fields that are required for switching, wherein one entry is associated with each port. Configuration stage 208 also includes several registers. When configuration stage 208 obtains information from arbiter 206, configuration stage 208 sets up the inputs for the port table during a first cycle and multiplexes outputs for other port specific registers during a second cycle. At the end of the second cycle, configuration stage 208 sends output, including SOP, EOP, MOP, PURGE and statistic update, to parser stage 210.

Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, a 96-bit module header accompanying the packet is parsed by parser stage 210.

Figure 3:
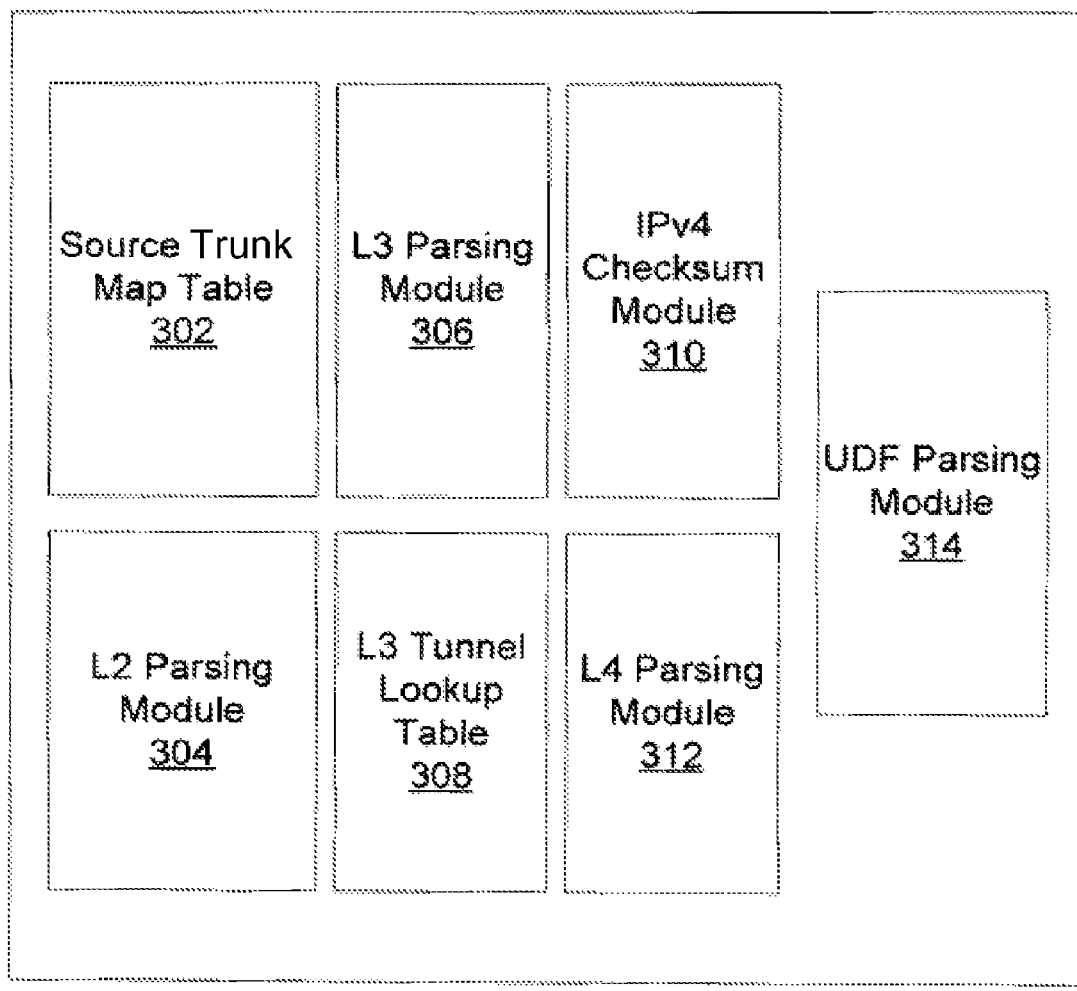
FIG. 3 illustrates the components of the parser stage.

FIG. 3 illustrates the components of parser stage 210. According to FIG. 3, parser stage 210 includes a source trunk map table 302, a L2 parsing module 304, Layer 3 (L3) parsing module 306, L3 Tunnel lookup module 308, IPv4 checksum module 310, Layer 4 (L4) parsing module 312 and user defined field (UDF) parsing module 314. Source trunk map table 302 is used by parser stage 210 for source trunk resolution. L2 parsing module 304 supports parsing of different types of layer 2 encapsulations, including Ethernet II, 802.3, SNAP and 802.3 LLC packet types. L3 parsing module 306 supports parsing of different types of L3 encapsulations, including IPv4 packets with or without options, IPv6 packets and ARP packets. Additionally, L3 parsing module 306 supports parsing tunneled packets to enable IP-in-IP and IPv6 over IPv4 tunneling. L3 tunnel lookup module 308 includes a 128 entry TCAM L3 tunnel table to enable parser 212 to determine if the incoming packet is a tunneled IPv4 packet. IPv4 checksum module 310 verifies the IPv4 checksum on the outer IPv4 header and checks the IPv4 checksum on an outer IPv4 header with or without options. L4 parsing module 312 supports L4 parsing and UDF parsing module 314 supports user defined fields parsing for allowing users to match on arbitrary fields within the first 128 bytes of the packet.

After all fields have been parsed, parser stage 210 writes the incoming cell data to the ingress pipeline buffer and passes a write pointer down the pipeline. Since the packet data is written to the ingress pipeline buffer, the packet data need not be transmitted further and the parsed module header information may be dropped. Discard stage 212 then looks for various early discard conditions and drops the packet and/or prevents it from being sent through the chip.

Switching stage 213 performs address resolution processing and other switching on incoming packets. According to an embodiment of the invention, switching stage 213 includes a first switch stage 214 and a second switch stage 216. First switch stage 214 resolves any drop conditions, performs BPDU processing, checks for L2 source station movement and resolves most of the destination processing for L2 and L3 unicast packets, L3 multicast packets and IPMC packets. First switch stage 214 also performs protocol packet control switching by optionally copying different types of protocol packets to the CPU or dropping them. First switch stage 214 further performs all source address checks and determines if the L2 entry needs to get learned or re-learned for station movement cases. First switch stage 214 further performs destination calls to determine how to switch packets based on a destination switching information. Specifically, first switch stage 214 figures out the destination port for unicast packets or port bitmap of multicast packets, calculates a new priority, optionally traps packets to the CPU and drops packets for various error conditions. First switch stage 214 also includes a DSCP_Table for mapping an incoming IPv4 or IPv6 DSCP to a new value. First switch stage 214 further includes rate limiting counters that provide the ability to program specific rates for multicast, broadcast and DLF traffic. First switch stage 214 handles high speed switch processing separate from switch processing from port 109*a*-109*x* and switches incoming high speed packets based on their stage header operation codes.

Second switch stage 216 then performs FP action resolution, source port removal, trunk resolution, high speed trunking, port blocking, CPU priority processing, end-to-end Head of Line (HOL) resource check, resource check, mirroring, maximum transfer length (MTU) checks for verifying that the size of incoming/outgoing packets is below a maximum transfer length. Second switch stage 216 takes first switch stage 216 switching decision, any L3 routing information and FP redirection to produce a final destination for switching. Second switch stage 216 also removes the source port from the destination port bitmap and performs trunk resolution processing for resolving the trunking for the destination port for unicast packets, the ingress mirror-to-port and the egress mirror-to-port. Second switch stage 216 also performs high speed trunking by checking if the source port is part of a high speed trunk group and, if it is, removing all ports of the source high speed trunk group. Second switch stage 216 further performs port blocking by performing masking for a variety of reasons, including meshing and egress masking. Second switch stage 216 also determines priority/Class of Service for packets that are being sent to the CPU. Second switch stage 216 further performs resource checks before mirroring to generate an accurate port bitmap for egress mirroring and to remove any resource-limited ports that might have been added by mirroring. Second switch stage 216 then outputs the p-bus fields and the cell data to MMU 104. The p-bus fields indicate to egress stage 106 how to switch and modify the packet.

Upon receiving the packet from MMU 104, egress module 106 supports multiple egress functions for a 72 gigabyte port bandwidth and a CPU processing bandwidth. According to an embodiment, egress module 106 is capable of handling more than 72 Gig of traffic, i.e., 24 one GE port, 4 high speed ports (12 G) and a CPU processing port of 0.2 GE. Egress module 106 receives original packets, as inputted from Ethernet ports 109*a*-109*x*, from MMU 104, and may either transmit modified or unmodified packets to destination ports 109*a*-109*x*. According to one embodiment of the invention, all packet modifications with device 100 are made in egress module 106 and the core processing of egress module 106 is capable of running faster than the processing of destination ports 109*a*-

109x. Therefore, egress module 106 provides a stall mechanism on a port basis to prevent ports 109a-109x from becoming overloaded and thus services each port based on the speed of the port.

In an embodiment of the invention, egress module 106 is connected to MMU 104 by a 1024 bit data interface and all packets transmitted from MMU 104 pass through egress module 106. Specifically, MMU 104 passes unmodified packet data and control information to egress module 106. The control information includes the results of table lookups and switching decisions made in ingress module 102. The data bus from MMU 104 is shared across all ports 108 and 109 and the CPU processing module 111. As such, the bus uses a "request based" TDM scheme, wherein each Gig port has a turn on the bus every 72 cycles and each high speed Port 108 has a turn every 6 cycles. CPU processing packet data is transmitted over bubbles-free spaces occurring on the bus. Upon receiving the information for MMU 104, egress module 106 parses the packet data, performs table lookups, executes switch logic, modifies, aligns and further buffers the packet before the data is transmitted to the appropriate destination port 109a-109x.

Egress module 106 is connected to CPU processing module 111 through a 32 bit S-bus interface which the CPU uses to send requests to egress module 106. The requests are typically for reading the egress module's resources, i.e., registers, memories and/or stat counters. Upon receiving a request, egress module 106 converts the request into a command and uses a mechanism, described in detail below, for storing and inserting CPU instructions into a pipeline wherever there is an available slot on the pipeline.

Figure 4:
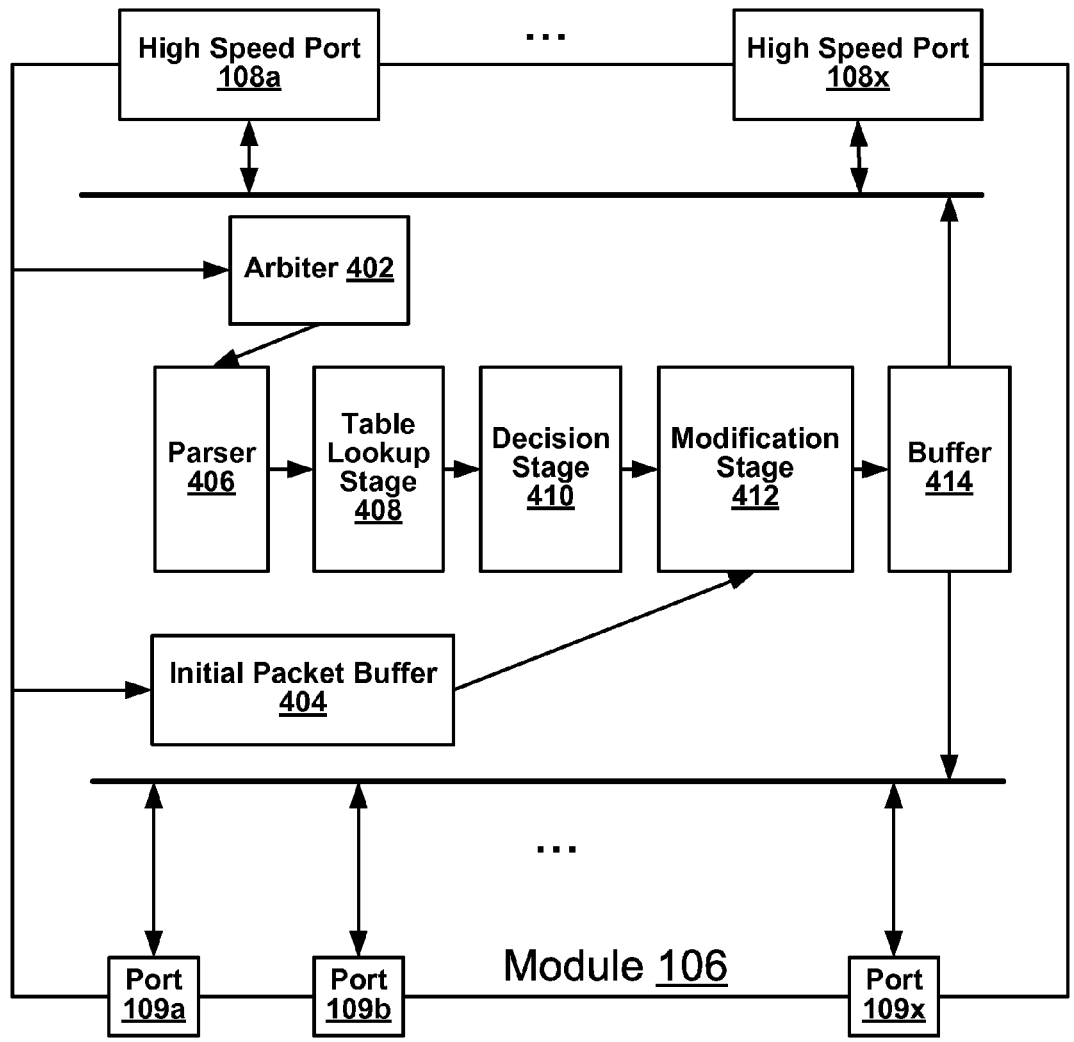
FIG. 4 illustrates a centralized egress pipeline architecture of an egress stage.

FIG. 4 illustrates a centralized egress pipeline architecture 400 of egress stage 106. Egress pipeline 400 includes an arbiter 402, parser 406, a table lookup stage 408, a decision stage 410, a modification stage 412 and a data buffer 414. Arbiter 402 provides arbitration for accessing egress pipeline 400 resources between packet data and control information from MMU and information from the CPU. Parser 406 performs packet parsing for table lookups and modifications. Table lookup stage 408 performs table lookups for information transmitted from parser 406. Decision stage 410 is used for deciding whether to modify, drop or otherwise process the packet. Modification stage 412 makes modification to the packet data based on outputs from previous stages of the ingress module.

All incoming packet data from MMU 104 is transmitted to an initial packet buffer 404. In an embodiment of the invention, the initial packet buffer is 1044 bits wide and 18 words deep. Egress pipeline 400 receives two inputs, packet data and control information from MMU 104 and CPU operations from the s-bus. Initial packet buffer 404 stores packet data and keeps track of any empty cycles coming from MMU 104. Initial packet buffer 404 outputs its write address and parser 406 passes the latest write address with pipeline instructions to modification stage 414.

Arbiter 402 collects packet data and control information from MMU 104 and read/write requests to registers and memories from the CPU and synchronizes the packet data and control information from MMU 104 and writes the requests from the CPU in a holding register. Based on the request type from the CPU, arbiter 402 generates pipeline register and memory access instructions and hardware table initialization instructions. After arbiter 402 collects packet data, CPU requests and hardware table initialization messages, it generates an appropriate instruction. According to an embodiment, arbiter 402 generates a Start Cell Packet instruction, an End Cell of Packet instruction, a Middle Cell of Packet instruction, a Start-End Cell of Packet instruction, a Register Read Operation instruction, a Register Write Operation instruction, Memory Read Operation instruction, a Memory Write Operation instruction, a Memory Reset Write Operation instruction, a Memory Reset Write All Operation instruction and a No Operation instruction. Egress pipeline 400 resources associated with Start Cell Packet instructions and Start-End Cell of Packet instructions are given the highest priority by arbiter 402. End Cell of Packet instructions, Middle Cell of Packet instructions, Register Read Operation instructions, Register Write Operation instructions, Memory Read Operation instructions and Memory Write Operation instruction receive the second highest priority from arbiter 402. Memory Reset Write Operation instructions and Memory Reset Write All Operation instructions receive the third highest priority from arbiter 402. No Operation instructions receive the lowest priority from arbiter 402.

After receiving an instruction from arbiter 402, parser 406 parses packet data associated with the Start Cell of Packet instruction and the Start-End Cell of Packet instruction using the control information and a configuration register transmitted from arbiter 402. According to an embodiment, the packet data is parsed to obtained L4 and L3 fields which appear in the first 148 bytes of the packet.

Figure 5:
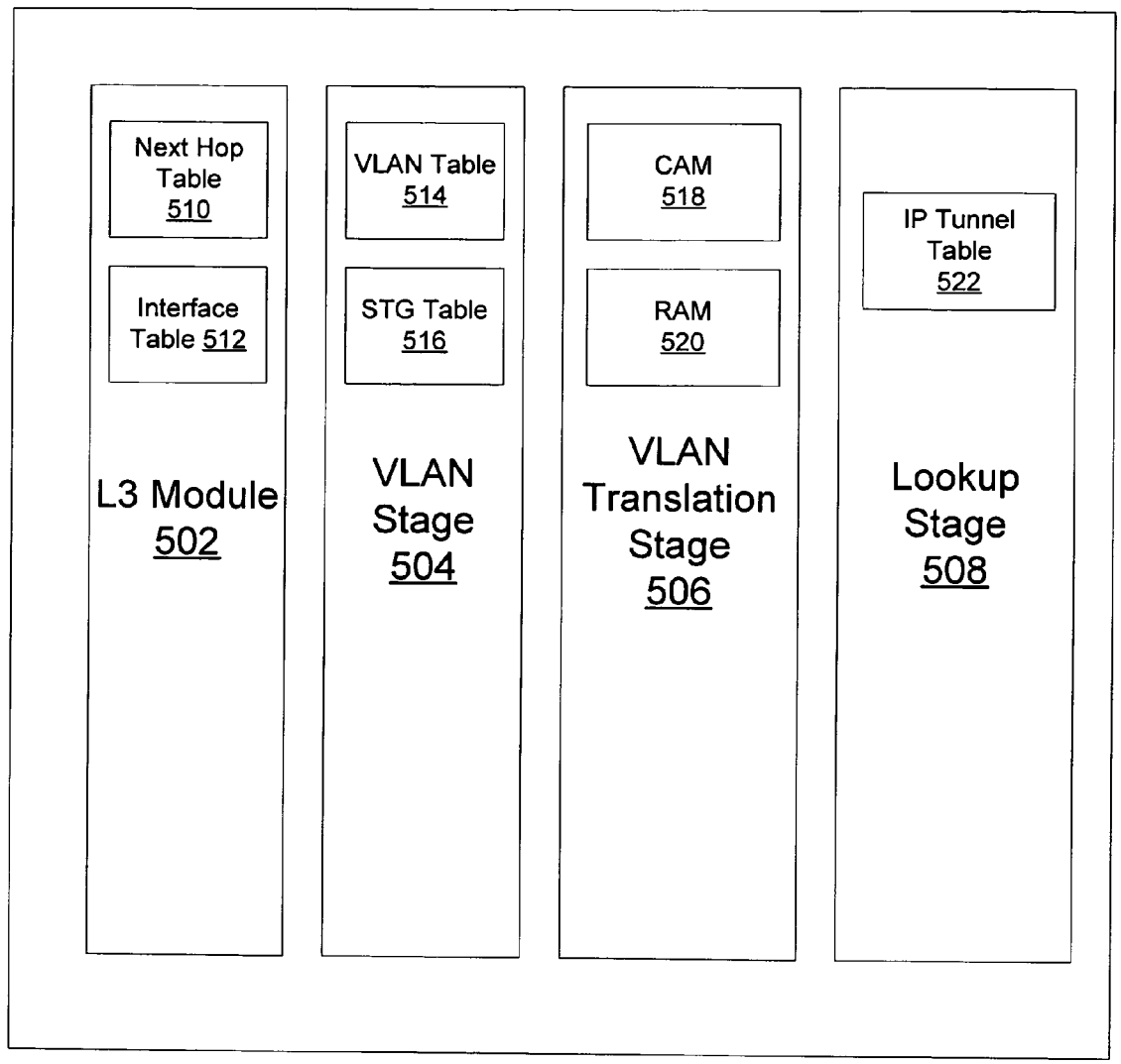
FIG. 5 illustrates an embodiment of a table lookup stage.

Table lookup stage 408 then receives all packet fields and register values from parser 406. FIG. 5 further illustrates table lookup stage 408. Table lookup stage 408 includes a L3 Module 502, a VLAN stage 504, a VLAN translation stage 506 and IP tunneling lookup stage 508. In an embodiment of the invention, L3 Module 502 includes a 8 k deep Next Hop Table 510 and a 4K deep Interface table 512. Next Hop table 510 is indexed based on a 13 bit wide next hop index from MMU 104 and Next Hop table 510 provides a MAC Address and an Interface Number that is used, depending on the type of packet, to index Interface table 512. For all Memory Read Operation and Memory Write Operation instructions, table lookup stage 408 decodes the address and writes or reads data from corresponding tables.

VLAN stage 504 is used to obtain VLAN related information and a spanning tree state of an outgoing port. VLAN stage 504 includes a VLAN table 514 and a stage (STG) table 516. VLAN table 514 is indexed based on the VLAN IDs from either the packet or Interface table 512. If a VLAN table lookup results in a "miss", i.e., an invalid VLAN, then the packet may be dropped. If the VLAN entry is valid but the outgoing port is not a member of the VLAN, then the packet may be also dropped. The VLAN table outputs a VLAN membership, untagged bitmap, and a STG group number which is used to index STG table 516. STG table 516 outputs an STG vector which contains the spanning tree state of the outgoing ports. VLAN stage 504 also determines whether the packet should be modified in egress pipeline 400 for CPU and ingress mirroring cases.

VLAN translation stage 506 translates the incoming VLAN to a new one and searches various tables. VLAN translation stage 506 includes a Content Addressable Memory (CAM) 518 and an associated Data Random Addressable Memory (RAM) 520. CAM 518 is searched with the VLAN ID and the destination port number and if an associated entry is found, an address is obtained from CAM 518 to access the associated Data RAM 520.

IP tunneling lookup stage 508 obtains a partial Tunnel IP header from appropriate tables, registers and parsed packet fields. IP tunneling lookup stage 508 includes a IP tunnel table 522 that is indexed using a tunnel index from interface table 512 and outputs tunnel type, among other information, which is used to distinguish among tunnel protocols that are implemented in egress pipeline 400.

Information from table lookup stage 406 is then transmitted to decision stage 410 where a decision is made as to whether to modify, drop or otherwise process the packet. For example, decision stage 410 first looks for flush bits at the beginning of the packet transmission and if the flush bits are set, the packets are marked "dropped". In an embodiment of the invention, if a flush bit for a packet is set for a packet already in transmission, the packet is completely transmitted and the next packet is flushed. In another example, MMU 104 may mark packets as Purge, Aged or Cell Error and decision stage 410 may either be drop or transmit these packets, but mark them as erroneous. In another example, if a VLAN translate feature is enabled, but there was a miss in CAM 518 lookup, the decision stage 410 may drop the corresponding packet if certain fields are set. Decision stage 410 also determines if the packet needs to be L4 switched or L3 routed and the type of mirroring functions that need to be performed on the packet.

Modification stage 412 thereafter constructs a Tunnel IP Header and a module header for the packet, makes replacement changes in the packet and computes IP checksum for outer and inner IP headers. Modification stage 412 receives a packet data interface from the initial buffer 404 which enables modification stage 412 to provide a read address to initial buffer 404 and in response obtain the packet data and basic control data. Modification stage 412 then generates Middle of Packet and End of Packet instructions based on the data received from initial buffer 404 and makes changes based on these commands. Modification stage 412 also receives all packet decisions and pipeline commands decision stage 410 and uses this information to make further changes to the packet. Specifically, all fields of the tunnel IP header which need to be filled by incoming packet fields are filled. Furthermore, IP checksum for tunnel IP header is computed in parallel with the header construction. Modification stage 412 further reads back packets and control information from initial buffer 404 and performs all packet modifications and replacements of fields. It outputs CPU operations and hardware commands and data and addresses associated with them on one bus and outputs packet data and control information on another bus. Additionally, modification stage 412 performs physical encapsulation and de-capsulation of headers and tag removal and insertions. If a packet is going to a high speed port, modification stage 412 converts the packet from Ethernet format to high speed format. Modification stage 412 also aligns the packet by padding packets smaller than 64 bytes and removes holes by aligning data to 1314 bit boundary. Thereafter, 1314 bits "complete" data word is outputted from modification stage 412 to the data buffer 414.

Data buffer 414 stores completed data words from modification stage 412 in memory. Before the egress pipeline sends packets out to destination ports 109a-109x, the packet data are stored in the data buffer 414 for pipeline latency and port speed matching. Data buffer 414 is capable of requesting data from MMU 104 whenever it has a free space.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for processing packets, the network device comprising:

an ingress module configured to perform switching functions on an incoming packet, the ingress module comprising a centralized ingress pipeline, wherein the centralized ingress pipeline is configured such that the incoming packet, when processed by the ingress module, proceeds serially through the centralized ingress pipeline;

a memory management unit configured to store packets and perform resource checks on each packet;

an egress module configured to perform packet modification and transmit the packet to an appropriate destination port, the egress module comprising a centralized egress pipeline, wherein the centralized egress pipeline is configured such that the incoming packet, when processed by the egress module, proceeds serially through the centralized egress pipeline;

wherein instructions associated with each of the switching of the ingress module, the storing of the memory management unit and packet modification of the egress module are each configured to complete processing of one packet every clock cycle, and wherein the egress module further comprises an initial buffer configured to store packet data and keep track of any empty cycles transmitted from a CPU, wherein the initial buffer is configured to output its write address to a parser, the parser being configured to pass the write address to a modification stage, the parser being configured to parse packets for table lookups and modifications and the modification stage being configured to construct a tunnel IP header and a module header for the packet, make modifications in the packet and compute a checksum for outer and inner headers.

2. The network device according to claim 1, further comprising a plurality of high speed ports and at least one port for an external processing unit, wherein the network device interface is configured to communicate with the external processing unit through a CPU processing module that is coupled with the at least one port for the external processing unit.

3. The network device according to claim 1, wherein the centralized ingress pipeline comprises:

a data holding register configured to hold data received from one of a plurality of ports prior to arbitration;

a module header holding register configured to store an incoming module header that is associated with an incoming packet;

an arbiter coupled with the data holding register and the module holding register, the arbiter being configured to schedule requests from a plurality of ports, wherein upon scheduling the request the arbiter is configured to transmit the incoming packet to a configuration stage;

the configuration stage being configured to set up a table with port specific fields for switching, wherein one entry of the table is associated with one of the plurality of ports, wherein upon setting up the table the configuration stage is configured to transmit an output to a parser stage;

the parser stage being configured to parse incoming packets from the plurality of ports and to parse a module header that is associated with an incoming packet;

a discard stage coupled with the parser stage, the discard stage being configured to identify early discard conditions and perform one of dropping or prevent the packet from being sent through the centralized ingress pipeline; and a switch stage coupled with the discard stage, the switch stage being configured to perform switch processing on packets in the centralized ingress pipeline.

4. The network device according to claim 3, wherein the centralized ingress pipeline is configured to schedule requests from a plurality of non-CPU ports every six clock cycles and to receive one cell request at a time from a CPU port, wherein the centralized ingress pipeline is configured to multiplex signals from the non-CPU ports and the CPU port based on a determination by the arbiter.

5. The network device according to claim 3, wherein the arbiter comprises a main arbiter configured to schedule requests from non-CPU ports and an auxiliary arbiter configured to schedule other requests, wherein requests from the main arbiter are given a highest priority.

6. The network device according to claim 3, wherein the parser stage is configured to manage an ingress pipeline buffer, wherein upon parsing fields of the incoming packet the parser stage is configured to write cell data to the ingress pipeline buffer and data is pulled from the ingress pipeline buffer and transmitted to the memory management unit.

7. The network device according to claim 3, wherein the parser stage comprises:
    a source trunk map table configured to perform source trunk resolution;
    a layer 2 parsing module configured to parse different types of layer 2 encapsulations;
    a layer 3 parsing module configured to parse different types of layer 3 encapsulations and to parse tunneled packets;
    a layer 3 tunnel lookup module configured to enable the parser stage to determine if an incoming packet is an Internet Protocol version 4 packet;
    an Internet Protocol version 4 checksum module configured to verify the Internet Protocol version 4 checksum on an outer Internet Protocol version 4 header;
    a layer 4 parsing module configured to parse different types of layer 4 encapsulations; and
    a user defined field parsing module configured to parse user defined fields and to allow a user to match on arbitrary fields within the packet.

8. The network device according to claim 3, wherein the switch stage comprises:
    a first switch stage configured to perform at least one of resolving drop conditions, layer 2 switching, layer 3 switching and programming specific rates for different types of traffic; and
    a second switch stage configured to obtain information from the first switch stage to produce at least one destination port for the incoming packet, wherein the second switch stage is configured to transmit control data and cell data to the memory management unit.

9. The network device according to claim 1, wherein the egress module is configured to support multiple egress functions for a 72-gigabyte port bandwidth and a CPU processing bandwidth.

10. The network device according to claim 1, wherein the egress module is configured to transmit at least one of modified and unmodified packets to at least one destination port and the egress module comprises a stall mechanism configured to prevent the at least one destination port from being overloaded.

11. The network device according to claim 1, wherein the egress module is coupled with the memory management unit via a data interface, such that all packets from the memory management unit pass through the egress module.

12. The network device according to claim 1, wherein the egress module is coupled with a CPU processing module via an s-bus interface so as to receive requests sent to the egress module from a CPU, wherein the egress module is configured to convert CPU requests into a command and insert instructions in the CPU request in an available slot on an egress pipeline.

13. The network device according to claim 1, wherein the centralized egress pipeline comprises:
    an arbiter configured to schedule egress pipeline resources between requests from the memory management unit and the CPU, wherein the arbiter is configured to generate an appropriate instruction for each request, the parser being coupled with the arbiter;
    a lookup stage coupled with the parser, the lookup stage being configured to perform table lookups for information transmitted from the parser;
    a decision stage coupled with the lookup stage, the decision stage being configured to determine whether to modify, drop or otherwise process the packet, the modification stage being coupled with the decision stage; and
    a data buffer coupled with the modification stage, the data buffer being configured to store packet data for pipeline latency and port speed matching.

14. The network device of claim 13, wherein the lookup stage comprises:
    a layer 3 module configured to decode address and data from corresponding tables for certain memory operations;
    a VLAN stage configured to obtain VLAN related information and a spanning tree stage of an outgoing port;
    a VLAN translation stage configured to translate an incoming VLAN to a new one; and
    a tunneling lookup stage configured to obtain a partial tunnel IP header from at least one table, register and parsed field.

15. The network device of claim 13, wherein the modification stage is configured to obtain packet data and basic control information from an initial buffer and to perform packet modification and replacements of fields.

16. The network device of claim 13, wherein the modification stage is configured to perform physical encapsulation and de-capsulation of headers and tag removal and insertion.

17. The network device of claim 13, wherein the modification stage is configured to output CPU operations and hardware commands and associated data on one bus and to output packet data and control information on a second bus.

18. The network device of claim 13, wherein the modification stage is configured to align packets and transmit an aligned output to the data buffer.

19. A method for processing packets in a network device, the method comprising:
    performing, by a centralized ingress pipeline, switching functions on an incoming packet, wherein the incoming packet, when processed by the centralized ingress pipeline, proceeds serially through the centralized ingress pipeline;
    storing packets and performing resource checks on each packet; and
    implementing, by a centralized egress pipeline, packet modification and transmitting of the incoming packet to an appropriate destination port, wherein the incoming packet, when processed by the centralized egress pipeline, proceeds serially through the centralized egress pipeline;
    wherein instructions associated with each of performing, storing and implementing are each processed in one clock cycle and wherein processing of one packet by the network device is completed every clock cycle, and
    wherein the centralized egress pipeline comprises an initial buffer configured to store packet data and keep track of any empty cycles transmitted from a CPU, wherein the initial buffer is configured to output its write address to a parser, the parser being configured to pass the write address to a modification stage, the parser being configured to parse packets for table lookups and modifications and the modification stage being configured to construct a tunnel IP header and a module header for the packet, make modifications in the packet and compute a checksum for outer and inner headers.

20. An apparatus for processing packets in a network device, the apparatus comprising:

performing means for performing, by a centralized ingress pipeline, switching functions on an incoming packet, wherein the incoming packet, when processed by the centralized ingress pipeline, proceeds serially through the centralized ingress pipeline;

storing means for storing packets and performing resource checks on each packet; and implementing means for implementing, by a centralized egress pipeline, packet modification and transmitting of the incoming packet to an appropriate destination port, wherein instructions associated with each performing, storing and implementing means are each processed in one clock cycle and wherein processing of one packet by the network device is completed every clock cycle, and wherein the centralized egress pipeline comprises an initial buffer means for storing packet data and keeping track of any empty cycles transmitted from a CPU, wherein the initial buffer means is configured to output its write address to a parser means, the parser means being configured to pass the write address to a modification stage means, the parser means for parsing packets for table lookups and modifications and the modification stage means for constructing a tunnel IP header and a module header for the packet, making modifications in the packet and computing a checksum for outer and inner headers.

* * * * *